US007963500B1

(12) United States Patent
Holiday

(10) Patent No.: US 7,963,500 B1

(45) Date of Patent: Jun. 21, 2011

(54) SNOWMAN MOLD

(76) Inventor: Angela C. Holiday, Chicago, IL (US)

( * ) Notice: Subject to any disclaimer, the term of this patent is extended or adjusted under 35 U.S.C. 154(b) by 0 days.

(21) Appl. No.: 11/634,758

(22) Filed: Dec. 6, 2006

(51) Int. Cl.
*B28B 7/24* (2006.01)
*B29C 33/20* (2006.01)

(52) U.S. Cl. ........ 249/168; 249/117; 249/126; 249/155; 249/160; 249/163; D15/136; D21/629; 446/76; 446/97

(58) Field of Classification Search .................. 249/117, 249/126, 155–157, 160, 165, 167, 170–171, 249/121, 163, 168; D21/629; D15/136; 403/43, 46, 62, 80, 109.6, 116, 164, 265, 403/300–307; 446/76, 97
See application file for complete search history.

(56) References Cited

U.S. PATENT DOCUMENTS 1,453,288 A * 5/1923 Snowman ..................... 29/242
3,029,406 A * 4/1962 Huth ..................... 439/319
3,059,279 A * 10/1962 Rossi ..................... 249/134
3,061,572 A * 10/1962 Packer ..................... 524/524
3,841,019 A * 10/1974 Lorenzo ..................... 446/100
4,164,341 A * 8/1979 McComb ..................... 249/126
4,313,649 A * 2/1982 Morikawa et al. ............ 359/819
4,724,979 A * 2/1988 Cleevely et al. ........... 220/258.2
D345,435 S * 3/1994 McLaughlin, II ............ D26/125
5,380,237 A * 1/1995 Kenyon ..................... 446/491
5,397,196 A * 3/1995 Boiret et al. .................. 403/348
5,490,033 A * 2/1996 Cronin ..................... 361/212
5,632,926 A * 5/1997 Dyer, Jr. ..................... 249/121
D382,317 S * 8/1997 Huston ..................... D21/661
5,773,043 A * 6/1998 Hunter ..................... 425/311
5,788,873 A * 8/1998 Warsaw ..................... 249/170
5,814,380 A * 9/1998 Tamborello et al. .............. 428/9
5,851,415 A * 12/1998 Thomas ..................... 249/117
5,884,450 A * 3/1999 Ronchi ..................... 53/317
6,176,464 B1 * 1/2001 Harvey ..................... 249/126
6,206,433 B1 * 3/2001 Bloomer ..................... 285/88
6,226,068 B1 * 5/2001 Arcykiewicz et al. ........ 439/314
6,311,427 B1 * 11/2001 McNally ..................... 47/29.3
6,506,094 B1 * 1/2003 Chang ..................... 446/268
6,561,841 B2 * 5/2003 Norwood et al. ............. 439/489
6,568,949 B1 * 5/2003 Walters ..................... 439/319
6,719,440 B1 * 4/2004 Wang ..................... 362/249
6,808,407 B1 * 10/2004 Cannon ..................... 439/314
7,000,887 B1 * 2/2006 Mulhern ..................... 249/157
7,063,341 B2 * 6/2006 Tsai ..................... 280/87.041
7,097,476 B2 * 8/2006 Morikawa et al. ............ 439/157
7,264,531 B2 * 9/2007 Asperas ..................... 446/71
2004/0038584 A1 * 2/2004 Zahlit et al. ................... 439/489

* cited by examiner

*Primary Examiner* — Joseph S Del Sole
*Assistant Examiner* — Dimple Bodawala
(74) *Attorney, Agent, or Firm* — Thomas E. Hill; Wildman, Harrold Allen & Dixon LLP

(57) ABSTRACT

A mold for forming a snowman includes lower, intermediate and upper generally spherical, hollow members comprised of clear plastic. Each plastic member includes an upper aperture for filling the member with snow. The lower member includes a generally flat base portion for positioning stability and an upper connection ring adapted for secure coupling to a lower connection ring on the intermediate member. The intermediate member also includes an upper connection ring adapted for secure coupling to a lower connection ring on the upper member. The three connected members form a hollow, vertical structure which when filled with snow provides a snowman of classic shape, symmetry and proportions. The individual spherical hollow members are easily connected and disconnected, with the intermediate and upper members having apertures for receiving eye, nose, mouth and arm indicia, with the upper member further including a hat mounting arrangement in one embodiment.

1 Claim, 3 Drawing Sheets

SNOWMAN MOLD

FIELD OF THE INVENTION

This invention relates generally to apparatus for forming a snowman, and is particularly directed to a clear plastic mold for forming a snowman.

BACKGROUND OF THE INVENTION

Forming snow in the general shape of a human figure has long been a very popular activity for children, as well as for adults typically accompanied by children. While a very popular form of recreation, the construction of these types of figures is not easy and is usually controlled to a certain extent by the environment. For example, a common method of construction involves rolling a ball of snow on the ground coated with a layer of snow, or packing snow by hand to form spheres of snow, until the desired size of the typically three main body parts is achieved. This requires snow of proper consistency. If the snow is too dry it lacks the required adherency, while if the snow is too wet it lacks the requisite permanence necessary for forming a snow figure. The consistency of the snow is based entirely upon environmental factors, and is thus out of the control of those making the snowman.

In addition, the conventional method of forming a snowman briefly discussed above is frequently not feasible when attempted by children. For example, the size and weight of the rolled snow ball is frequently beyond the capability of children to roll over the ground and lift for positioning in the snow figure. Even in the case of adults engaged in the making of a snowman, the participants may suffer from fatigue and possibly even injury associated with the moving and lifting of heavy snow objects. One way to possibly avoid these potentially dangerous conditions is to make only very small snow figures. However, these small figures are much less pleasing to the viewer than larger figures, such as of adult size.

The present invention is intended to avoid the prior art problems encountered in making a snowman by providing three generally spherical, clear plastic structures each adapted to receive snow deposited in its upper aperture and further adapted to be connected together to form a generally vertical, self-supporting structure in the form and likeness of a conventional snowman.

OBJECTS AND SUMMARY OF THE INVENTION

Accordingly, it is an object of the present invention to provide apparatus which facilitates forming a snowman in a reliable, reproducible and fast manner.

It is another object of the present invention to provide a structure for forming a snowman which is easily and quickly assembled and disassembled, provides a snowman of classic shape, symmetry and proportions, and maintains the snow in snowman-shaped form as long as freezing temperatures prevail.

A further object of the present invention is to provide for the formation of a snowman which is stable, of virtually any size, and protects the thus formed figure from impact damage and disfigurement.

Still another object of the present invention is to provide an arrangement for forming a snowman which is reusable, lightweight and is adapted to receive easily positioned and removed indicia representing the snowman's facial characteristics, arms and hands, and a hat.

This invention contemplates apparatus for forming a snowman comprising a first lower, generally spherical hollow member of clear plastic having a diameter $d_1$, a generally flat base and a first upper aperture adapted to receive snow for filling the first hollow member with snow; a second intermediate, generally spherical hollow member of clear plastic having a diameter $d_2$ and a second upper aperture adapted to receive snow for filling the second hollow member with snow; a third upper, generally spherical hollow member of clear plastic having a diameter $d_3$ and a third upper aperture adapted to receive snow for filing the third hollow member with snow, where $d_1 > d_2 > d_3$; a first connector for coupling an upper portion of the first hollow member to a lower portion of the second hollow member; and a second connector for coupling an upper portion of the second hollow member to a lower portion of the third hollow member in forming a generally vertical, snow-filled snowman.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
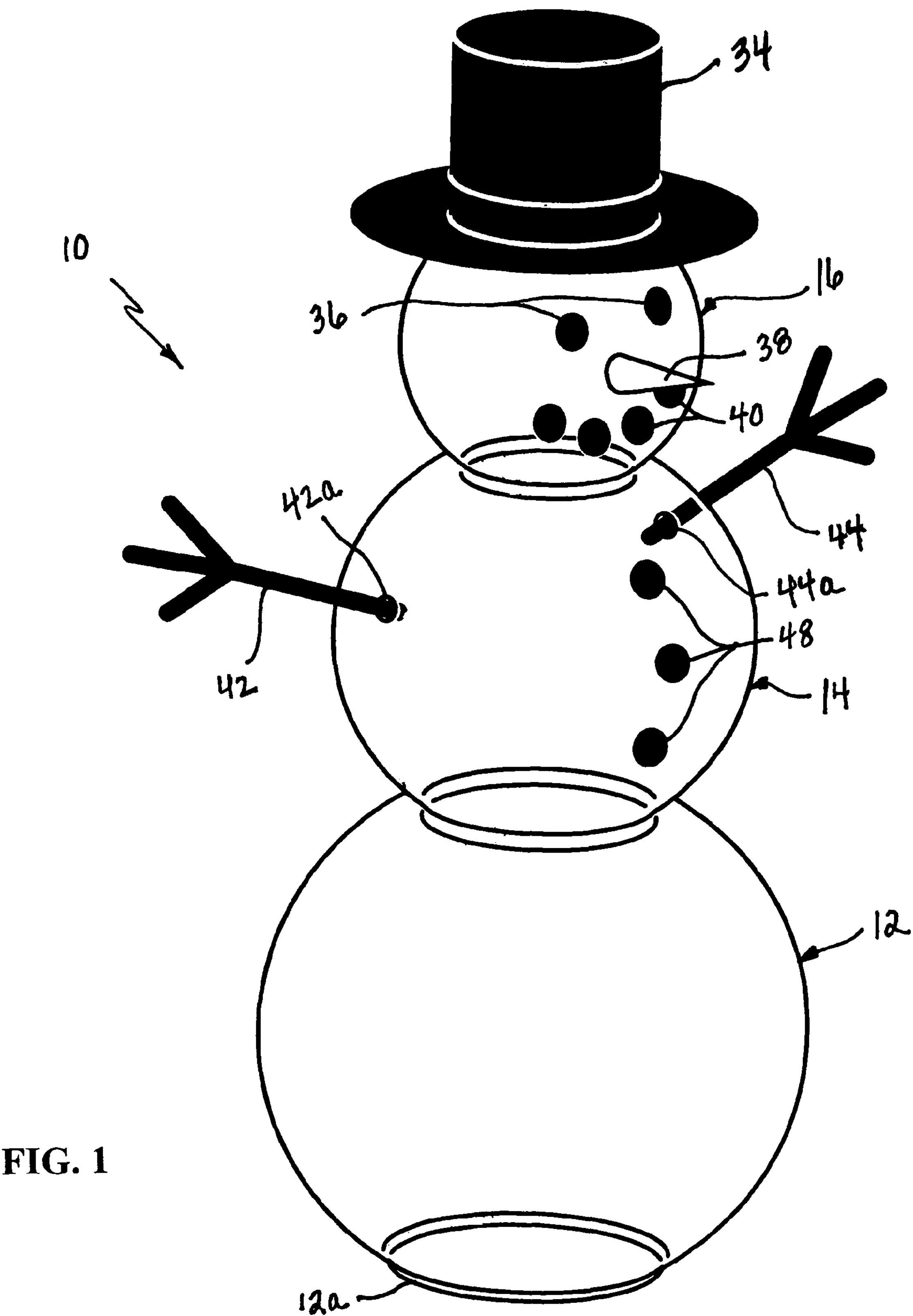
FIG. 1 is a perspective view of a mold for forming snowman in accordance with the principles of the present invention.
Figure 2:
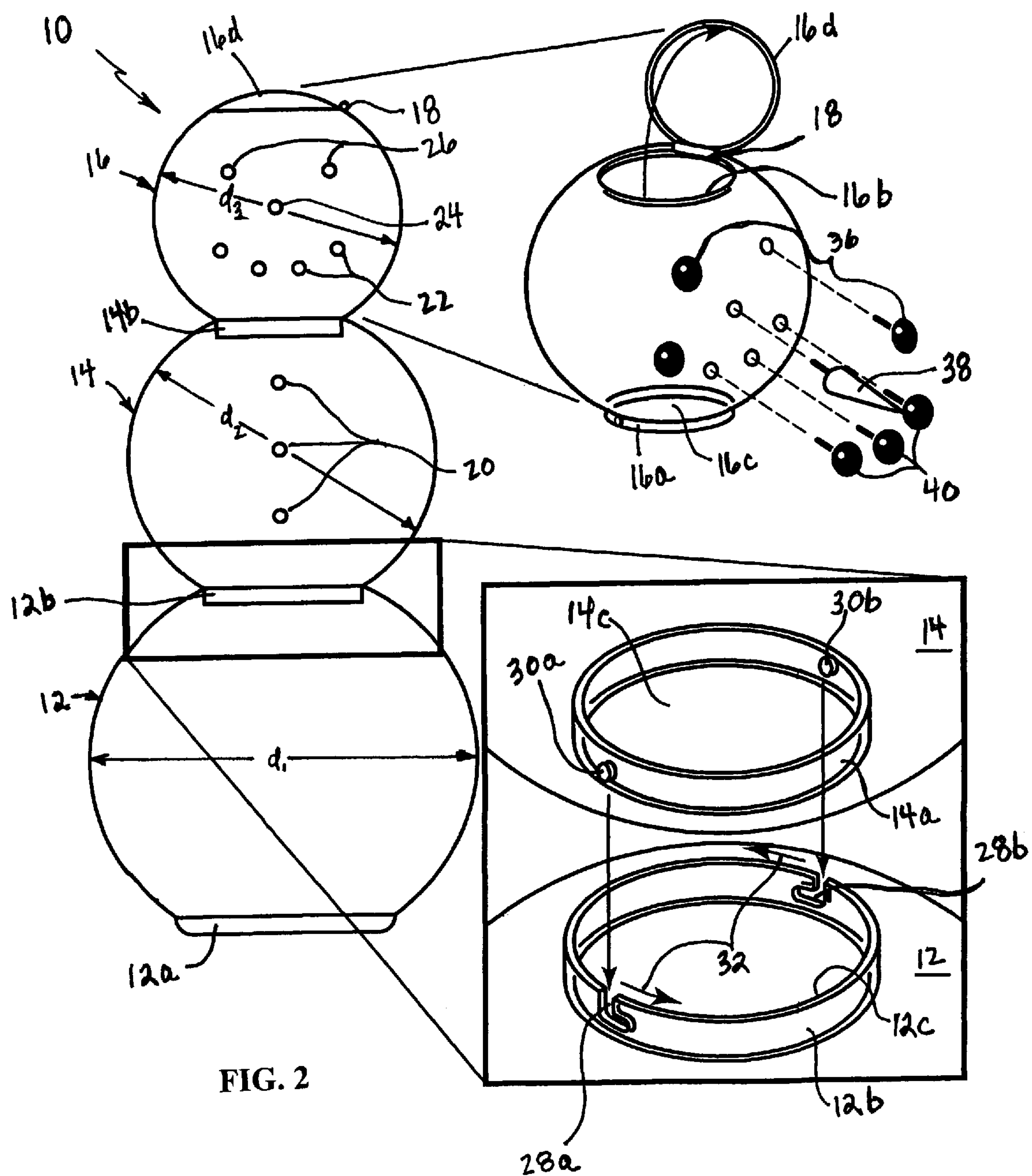
FIG. 2 is a side elevation view of the mold for forming a snowman shown in FIG. 1 illustrating additional details of the head portion of the mold, as well as the connection between adjacent elements of the mold.
Figures 3, 4:
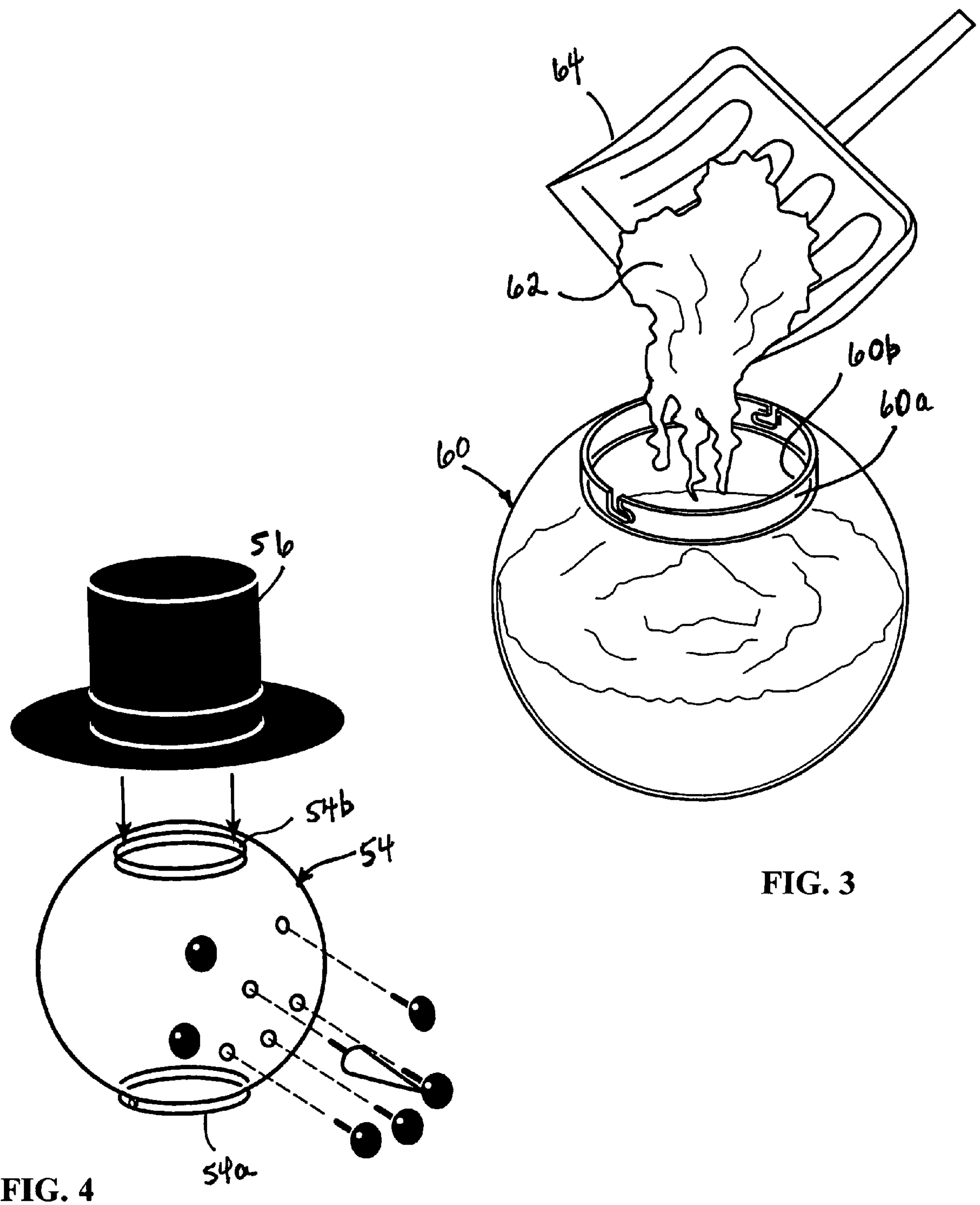
FIG. 3 is a perspective view illustrating the manner in which each of the body elements of the inventive snowman mold may be filled with snow.
FIG. 4 is an exploded perspective view of another embodiment of the head portion of the snowman mold of the present invention, also showing the manner in which a hat is positioned on and connected to the mold's head portion.

Referring to FIG. 1, there is shown a perspective view of a snowman mold 10 in accordance with the principles of the present invention. A side elevation view of the snowman mold 10 is shown in FIG. 2, with enlarged portions illustrating additional details of the connection between adjacent sections of the mold and details of the mold's upper mold member 16. FIG. 3 is a perspective view illustrating one approach to filling one of the mold members of the inventive snowman mold with snow in accordance with one aspect of the present invention. FIG. 4 is an exploded perspective view of another embodiment of the head portion of the inventive snow mold.

Snowman mold 10 includes a lower mold member 12, and intermediate mold member 14 and an upper mold member 16. When connected together as described in detail below, the lower, intermediate and upper mold members 12, 14 and 16 are in the general shape and configuration of a conventional snowman. A lower portion of the lower mold member 12 includes a generally flat base **12*a*, while an upper portion of the lower mold member includes an upper coupling collar 12*b*. The upper portion of the lower mold member 12 disposed within the upper coupling collar 12*b* is open, forming an aperture 12$c$, and is adapted to receive snow deposited within the lower mold member. Each of the lower, intermediate and upper mold members 12, 14 and 16 is preferably comprised of a high strength, clear, transparent plastic material so that snow deposited within each of these mold members is clearly visible to an observer. Each of the lower, intermediate and upper mold members is also hollow and generally spherical in shape. Finally, the lower mold member 12 has the largest diameter $d_1$, the upper mold member 16 has the smallest diameter $d_3$, and the intermediate mold member 14** has a diameter $d_2$ intermediate in size between the diameters of the lower and upper mold members.

The intermediate mold member 14 is adapted for positioning on and coupling to the lower mold member 12 as shown in FIG. 2. Attached to an upper portion of the lower mold member 12 is the aforementioned upper coupling collar 12$b$. Similarly, attached to a lower portion of the intermediate mold member 14 is a lower coupling collar 14$a$, as shown in an enlarged portion of the snowman mold shown in FIG. 2. The lower mold member's upper coupling collar 12$b$ is provided with a pair of coupling slots 28$a$ and 28$b$ disposed on opposed portions of the generally circular upper coupling collar and displaced from one another by on the order of 180°. Similarly, disposed on the intermediate mold member's lower coupling collar 14$a$ and arranged on the order of 180° from one another are a pair of coupling pins 30$a$ and 30$b$. The first coupling pin 30$a$ is adapted for positioning in the first coupling slot 28$a$, while the second coupling pin 30$b$ is adapted for positioning within the second coupling slot 28$b$. With the first coupling pin 30$a$ inserted in the first coupling slot 28$a$ and the second coupling pin 30$b$ inserted in the second coupling slot 28$b$, the combination of the intermediate mold member 14 and lower coupling collar 14$a$ is rotated in the direction of arrows 32 shown in FIG. 2 for securely connecting the lower and intermediate mold members 12, 14. Rotation of the lower coupling collar 14$a$ in a direction opposite to arrows 32 shown in FIG. 2 allows coupling pins 30$a$ and 30$b$ to be respectively removed from slots 28$a$ and 28$b$ and the intermediate mold member 14 to be disconnected from the lower mold member 12.

The area within the intermediate mold member's lower coupling collar 14$a$ forms a flat base 14$c$ for the intermediate mold member 14 also preferably comprised of clear plastic. An upper portion of the intermediate mold member 14 is provided with an upper coupling collar 14$b$ defining an aperture within an upper portion of the intermediate mold member to allow the intermediate mold member to be filled with snow. The intermediate mold member's upper coupling collar 14$b$ is provided with a connection arrangement similar to that shown for the case of the upper coupling collar 12$b$ of the lower mold member 12, while a lower portion of the upper mold member 16 is provided with a coupling collar (not shown for simplicity) for allowing the intermediate mold member 14 to be securely connected to a lower portion of the upper mold member. The area within the upper mold member's lower coupling collar 16$a$ forms a generally flat base 16$c$ also preferably comprised of clear plastic. An upper portion of the upper mold member 16 is provided with an aperture 16$b$ allowing the upper mold member to be filled with snow. Attached to the upper mold member 16 adjacent the upper aperture 16$b$ therein by means of a hinge 18 is a movable top lid 16$d$. The top lid 16$d$ is movable between an open position as shown in the enlarged portion of FIG. 2 for filling the upper mold member 16 with snow, and a closed position, also as shown as FIG. 2, for covering the snow deposited within the upper mold member. The upper portion of the upper mold member 16 is adapted to receive a hat 34 for secure positioning on the upper mold member as described in detail below.

Disposed in a lateral portion of the intermediate mold member 14 are plural spaced button apertures 20 each adapted to receive a respective button 48 as shown in FIG. 1. Similarly, disposed on a lateral portion of the upper mold member 16 are plural mouth apertures 22 each adapted to receive a respective mouth element 40 and a pair of eye apertures 26 each adapted to receive a respective eye 36 also as shown in FIG. 1. In addition, a nose aperture 24 is disposed in a lateral portion of the upper mold member 16 for receiving and supporting a nose 38. Finally, disposed on opposed lateral portions of the intermediate mold member 14 are first and second mounting apertures 42$a$ and 44$a$. The first mounting aperture 42$a$ is adapted to receive and engage a first arm/hand member 42, while the second mounting aperture 44$a$ is adapted to receive and support a second arm/hand member 44 as shown in FIG. 1.

Referring to FIG. 3, there is shown a perspective view of the manner in which a mold member 60 may be filed with snow. In this example, snow 62 is deposited from a shovel 64 into the mold member 60 through an upper aperture 60$b$ formed in an upper coupling collar 60$a$ of the mold member. The mold member 60 is preferably filled to the top with snow before the mold members are connected together to form a snowman mold in accordance with the present invention.

Referring to FIG. 4, there is shown an exploded perspective view of another embodiment of an upper mold member 54 for use in the snowman mold of the present invention. Upper mold member 54 includes a lower coupling collar 54$a$ similar to the previously described lower coupling collar of the upper mold member shown in FIG. 2 for attaching the upper mold member to an upper portion of an intermediate mold member as previously described. Upper mold member 54 also includes an upper coupling collar 54$b$ for securely attaching a hat 56 to an upper portion of the upper mold member 54. An inner, lower portion of the hat 56 also includes a coupling collar similar to those previously described for attaching the hat to the upper mold member 54, although this is not shown in FIG. 4 for simplicity. Finally, the embodiment of the upper mold member 54 shown in FIG. 4 also includes plural apertures for receiving and supporting elements representing facial details as previously described.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for forming a snowman comprising:

a first lower, generally spherical hollow member of unitary construction and of clear, transparent plastic having a diameter $d_1$, a generally flat base and a first upper aperture adapted to receive snow for filling said first hollow member with snow;

a second intermediate, generally spherical hollow member of unitary construction and of clear, transparent plastic having a diameter $d_2$ and a second upper aperture adapted to receive snow for filling said second hollow member with snow;

a third upper, generally spherical hollow member of unitary construction and of clear, transparent plastic having a diameter $d_3$ and a third upper aperture adapted to receive snow for filling said third hollow member with snow, where $d_1>d_2>d_3$;

a first connector for coupling an upper portion of said first hollow member to a lower portion of said second hollow member; and a second connector for coupling an upper portion of said second hollow member to a lower portion of said third hollow member in forming a generally vertical, snow-filled snowman, wherein said lower, intermediate and upper spherical hollow members remain in position about the snowman after the snowman is formed, wherein each of said first and second connectors includes respective first and second interfitting members, and wherein each interfitting member is disposed on one of the spherical hollow members to be connected together, wherein each of said first interfitting members includes first and second coupling pins and each of said second interfitting members includes first and second slots adapted to receive said first and second coupling pins, respectively, for securely connecting two of said spherical hollow members together, and wherein each of said first interfitting members further includes a first generally circular collar and each of said second interfitting members includes a second generally circular collar, wherein each pair of first and second collars are adapted for mutual engagement and relative rotational displacement in connecting and disconnecting a pair of spherical hollow members, and a third connector disposed on an upper portion of said third upper spherical member, wherein said third connector comprises a third collar adapted for receiving and engaging a hat disposed on said third upper spherical hollow member, wherein said first and second coupling pins are positioned in engagement with said first and second slots, respectively, when one spherical hollow member is rotated in a first direction relative to another spherical hollow member for securely connecting the two spherical hollow members, and wherein said first and second coupling pins are removed from engagement from a slot when said one spherical hollow member is rotated in a second, opposed direction relative to said other spherical hollow member for disconnecting the two spherical hollow members, and wherein said first and second coupling pins move in opposite directions during connection and disconnection of two spherical hollow members.

* * * * *